United States Patent
Bonno et al.

(10) Patent No.: US 9,500,209 B2
(45) Date of Patent: Nov. 22, 2016

(54) CLIP FOR OBJECT GROUPING AND ORGANIZED STORAGE

(71) Applicant: Nationwide Promotions, LLC, San Diego, CA (US)

(72) Inventors: Chris Bonno, Irvine, CA (US); Didem Ellermeyer, Irvine, CA (US)

(*) Notice: Subject to any disclaimer, the term of this patent is extended or adjusted under 35 U.S.C. 154(b) by 0 days.

(21) Appl. No.: 14/746,253

(22) Filed: Jun. 22, 2015

(65) Prior Publication Data

US 2015/0366301 A1 Dec. 24, 2015

Related U.S. Application Data

(60) Provisional application No. 62/015,891, filed on Jun. 23, 2014.

(51) Int. Cl.
| | | |
|---|---|---|
| A44B 99/00 | (2010.01) |
| F16B 2/22 | (2006.01) |
| A45F 5/00 | (2006.01) |
| E05D 1/02 | (2006.01) |
| F16B 1/00 | (2006.01) |
| B42F 1/00 | (2006.01) |

(52) U.S. Cl.
CPC . *F16B 2/22* (2013.01); *A45F 5/00* (2013.01); *A45F 2200/05* (2013.01); *A45F 2200/0541* (2013.01); *A45F 2200/0558* (2013.01); *B42F 1/00* (2013.01); *E05D 1/02* (2013.01); *F16B 2001/0035* (2013.01); *Y10T 24/32* (2015.01); *Y10T 24/44274* (2015.01)

(58) Field of Classification Search
CPC .............. A45F 5/00; B42F 1/00; E05D 1/02; F16B 2001/0035; F16B 2/22; Y10T 24/32; Y10T 24/44274

See application file for complete search history.

(56) References Cited

U.S. PATENT DOCUMENTS

| | | | | |
|---|---|---|---|---|
| 2,448,611 A * | 9/1948 | Martin | ............. | B42D 9/004 116/234 |
| 3,529,328 A * | 9/1970 | Davison | ............. | A47G 25/485 16/87.2 |
| 4,255,837 A * | 3/1981 | Holtz | ............. | B42F 11/04 24/303 |
| 5,682,653 A * | 11/1997 | Berglof | ............. | G09F 1/10 224/183 |
| 7,066,494 B1* | 6/2006 | Di Prinzio | ............. | B42D 9/005 116/234 |
| 8,662,682 B2* | 3/2014 | Gorodisher | ............. | G08B 5/004 359/519 |
| 8,938,813 B2* | 1/2015 | McDowell | ............. | A41D 25/003 2/144 |
| 2006/0282993 A1* | 12/2006 | Dietz | ............. | A45C 11/34 24/303 |
| 2011/0232046 A1* | 9/2011 | Amron | ............. | A45C 1/06 24/303 |
| 2011/0252609 A1* | 10/2011 | Rothbaum | ............. | H01F 7/0263 24/306 |

* cited by examiner

*Primary Examiner* — Robert J Sandy
*Assistant Examiner* — David Upchurch
(74) *Attorney, Agent, or Firm* — Donn K. Harms

(57) ABSTRACT

A flexible clip is provided which has a flexible body running between opposing ends. The clip is foldable to an as-used position at a central portion thereof to a removable engagement of two end portions using mating fasteners such as magnets. The clip in the as-used position is removably engageable with both planar and three dimensional objects.

5 Claims, 3 Drawing Sheets

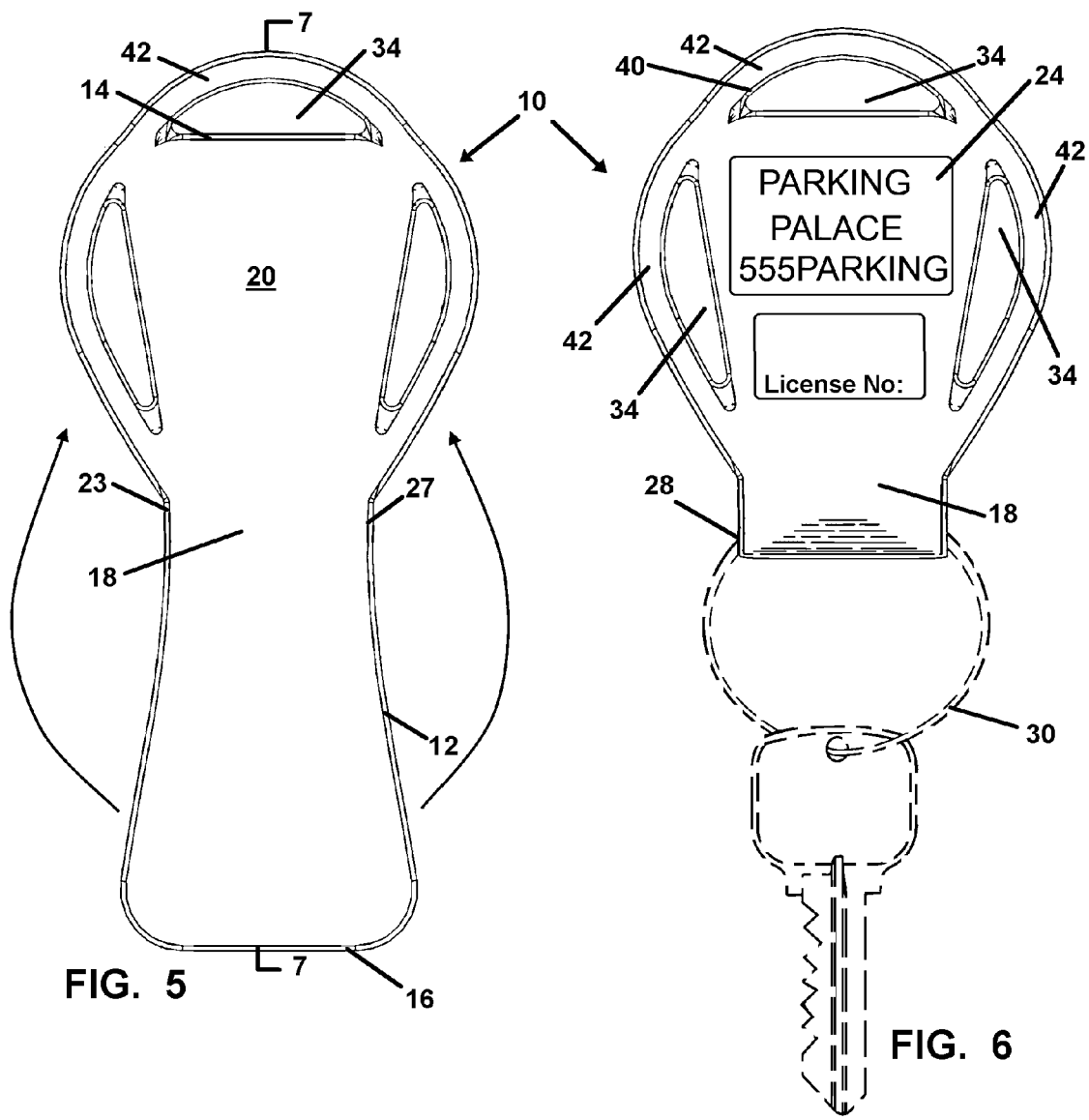
FIG. 5
FIG. 6
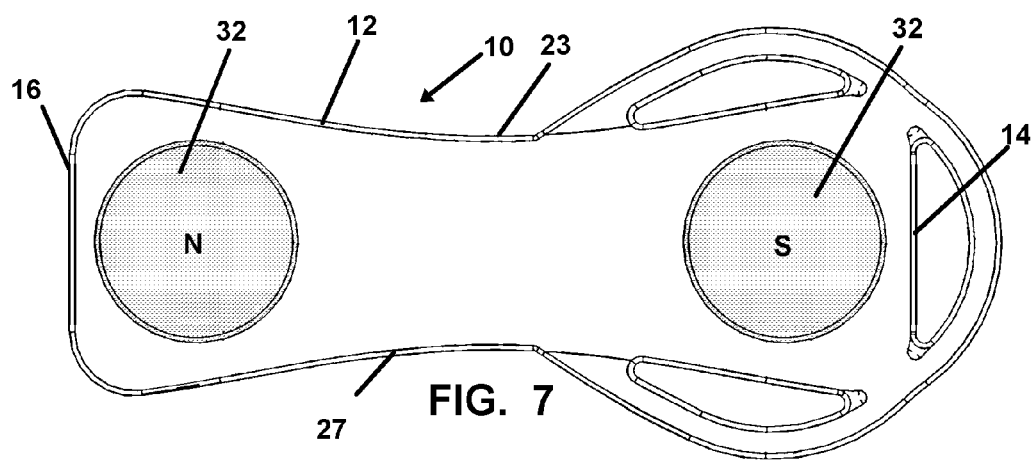
FIG. 7

CLIP FOR OBJECT GROUPING AND ORGANIZED STORAGE

This application claims priority to U.S. Provisional Patent Application Ser. No. 62/015,891 filed on Jun. 23, 2014 which is incorporated herein in its entirety by this reference thereto.

BACKGROUND OF THE INVENTION

1. Field of the Invention

The present invention relates to an improved device for the storage grouping of objects as well as the labeling and storage of such objects to which the device magnetically engages. More particularly it relates to a flexible magnetic clip configured for holding grouped objects such as paper together, or for easy engagement of three dimensional items such as key rings which are removably engaged through the employment of a flexible folding body having magnetic attraction of a first half thereof to the second half thereof.

2. Prior Art

Clips have been employed for many years for holding related objects in a group, as well as for holding individual objects and groups in a manner to provide a mount for the engaged object to a storage position.

For example paper is conventionally engaged by stapling or clipping a plurality of paper sheets in a group to maintain the group. Staples and paper clips and the like are conventionally employed for such tasks. However, both staples and paper clips, if not lost while the paper stack is stored or moved, must be removed and in the case of staples, thrown away.

Another popular use of clips is for holding objects for storage such as a set of keys on a rack at home or for instance in a parking lot where automotive keys are left with the lot employees so that the car the key operates may be moved about if need be, or brought to the owner on their return. It is imperative in a commercial setting, such as in a parking lot, that each individual set of keys for each vehicle be identified and stored in a manner which cross-references the stored key set with a location or parking spot of the vehicle to which the stored keys belong.

In the case of vehicle key storage in a commercial lot, there can be hundreds of sets of keys which are grouped onto many different types of rings and retainers. Conventionally they may be stored on a pegboard or rack wherein the differing sized rings and retainers can be a problem for organizing the many different key rings. Such lack of commonality as to key rings can cause storage boards to be unable to engage certain rings to the board or can cause sets of keys to cover other sets. Further, since the key rings are not identified as to the vehicle in an easily viewed manner, if at all, matching the vehicle to the key ring can be an arduous task.

As such, there is a continuing and unmet need for an improved clip which is configured for easy but secure engagement to objects such as key rings, or to provide secure engagement of grouped planar objects such as paper stacks and the like or to hold personal items such as eyeglasses secure. Such a device should not only be easily but securely engageable to items such as key rings and paper stacks, but also easily disengageable. In the case of vehicle keys, such a device should ideally provide an ability to identify the vehicle relating to the keys to which it is engaged, and ideally should provide a means for organized storage of a plurality of sets of such keys or key rings in a secure manner.

SUMMARY OF THE INVENTION

The device herein disclosed and described achieves the above-mentioned goals through the provision of a clip having a body formed of flexible but resilient material such as a polymeric material such as silicone, nylon, polyurethane, polyethylene, or other durable yet pliable materials capable of holding a shape of the body, but sufficiently flexible to bend and conform to a retained object, and return to the original shape.

The disclosed device in a particularly preferred mode includes an hourglass shaped body portion having a diameter at a mid portion of the body which is narrower than the diameter at the ends of the body. In a preferred mode which has been shown to be particularly flexible and allow for easy compression for insertion through a key ring and the like, the thickness of the body tapers from the thicker end portions to a thinnest portion at a central area of the body between both ends. This taper allows for the formation of an oval loop area, which is pliable, when the body is folded in half and inserted through a key ring, or when the body is folded and engaged around a planar surface such as paper. Further, this taper helps to cause the body to fold at the same particular position between the first end and second end every time, thereby providing means to register the adjacent positioning of the first end portion adjacent the second end portion every time the body is folded.

Means to maintain a first end of the body adjacent and in contact with a second end of the body when folded over on itself at the mid-portion, is provided by mating half fasteners or connectors. In a particularly preferred mode, such mating fasteners or connectors include magnets which are positioned within the interior of the body. The magnets are so positioned to cause the poles of one magnet to attract that of the other magnet when the body is folded in a direction toward a side of the body where the surface recedes in a tapered fashion to form the thinner central portion. This aligns the two magnets thereby holding the first end portion of the body adjacent to the second end. Snaps or mating fasteners or connectors such as hook and loop fabric might also be employed where three dimensional objects are encircled by the folding of the body around the object, but it has been found through experimentation that magnets provide an excellent removable engagement and also maintain the fasteners or connectors within the interior of the body so they do not catch upon the key ring or object or wear during use.

Also preferred in the device is the provision of one or a plurality of apertures formed along edges of both sides of the body to provide passages through which the device may hang when positioned upon a rack for instance. As depicted in the preferred mode, one or a plurality of apertures are formed between arched ribs connected to the body at opposing ends of each rib which define a perimeter edge thereof, thereby forming the aperture between the circumferential edge of the body, and the interior surface of the rib. The ribs are also formed of polymeric material which is flexible but elastic in nature such that the ribs can be temporarily deflected to enlarge a respective aperture, and then return to their original shape. This allows for easy engagement of the body of the device on a hook or peg by insertion of such through an aperture engaged with the body.

Also depicted herein are the substantially planar first and second surfaces of the body of the device which provides an excellent area for placement of indicia upon the device, either by printing or by writing upon the planar areas. Such allows for placement of indicia identifying a place such as a parking lot, and for the addition of hand-imparted indicia such as using a marker to write a license plate of the vehicle to which the engaged key ring matches.

Finally, as can be seen, the employment of a flexible body and engaging opposing body halves to form a loop, can also be used to form a mount using the loop, on other objects. For instance the device is engageable over the edges of clothing to provide an attachment point for other items such as a name badge.

It is an object of this invention to provide a clip which is easily engaged through and to a key ring, or in a compressive engagement of both ends with a stack or group of planar components such as paper.

Another object of this invention is to provide an easily engaged key ring identification component and hanger for the keys so engaged.

Yet another object of the device is to temporarily secure items to clothing without puncturing it.

These together with other objects and advantages which become subsequently apparent reside in the details of the construction and operation as more fully hereinafter described and claimed, reference being had to the accompanying drawings forming a part thereof, wherein like numerals refer to like parts throughout.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWING FIGURES

FIG. 5 shows how the body folds to mate respective surfaces at opposing ends of a second side surface to reach the folded configuration of FIGS. 3 and 6.

FIG. 6 depicts the device folded as in FIG. 5 and in an as-used positioning engaged with a key ring positioned between the mated ends and within the loop formed by the tapered portion.

FIG. 7 shows the two mating fasteners or connectors positioned on the body which as depicted is a sectional view along line 7-7 through FIG. 5 showing the internally positioner magnets.

DETAILED DESCRIPTION OF THE PREFERRED EMBODIMENTS OF THE INVENTION

Figure 1:
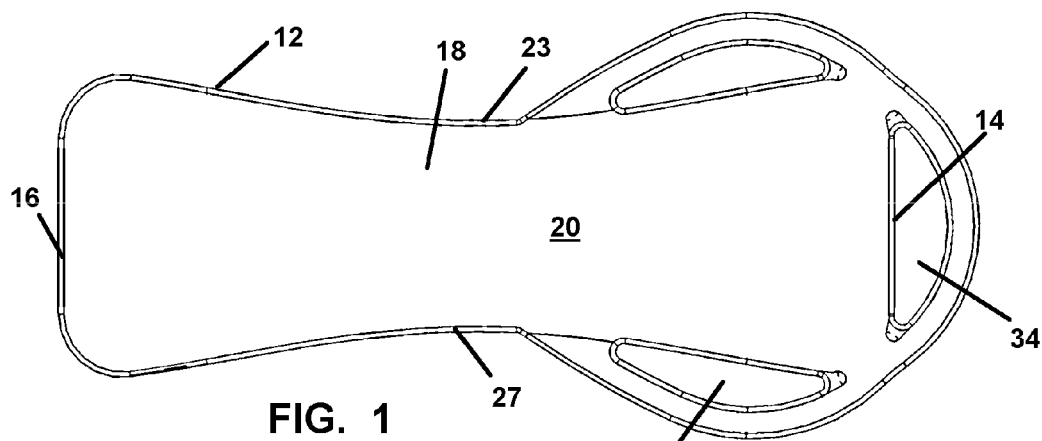
FIG. 1 is an overhead view of a first side of the device herein.

Referring now to the drawings of FIGS. 1-9 are the modes of the device 10 or clip herein. The device 10 has a resilient and flexible body 12 having a first end 14 opposite a second end 16 and having a central portion 19 of the body 12 therebetween. The body 12 is formed of flexible but resilient material such as a polymeric material such as silicone, nylon, polyurethane, polyethylene, or other durable yet flexible materials also has a first side surface 20 opposite a second side surface 22. Opposing side edges 23 and 27 run between the first end 14 and second end 16.

As shown in FIGS. 1 and 5, in a particularly preferred mode of the device, the body 12 has a narrower width running between opposing side edges 23 and 27 and between opposing ends 14 and 16, at the central portion 19 of the body 12, thereby forming somewhat of an hourglass shape.

Figure 2:
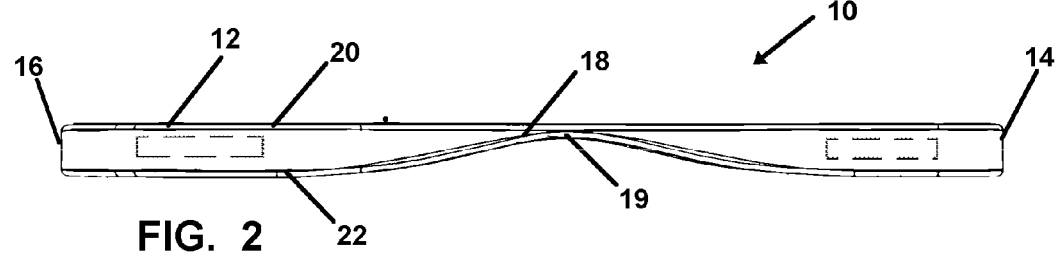
FIG. 2 depicts a side view of the device of FIG. 1 showing the tapering of the thickness of the body of the device from the thicker end portions toward a thinnest point of the body at a center position between to opposing ends.
Figure 3:
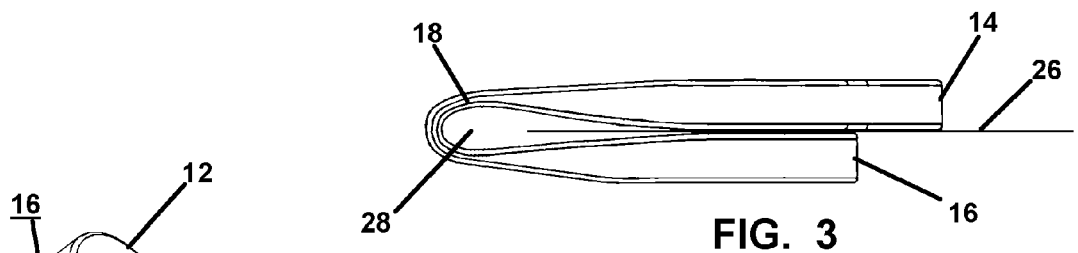
FIG. 3 shows the device of FIG. 2 in a folded as-used positioning where the first and second ends are held during use resulting in the formation of an oval loop at the mid portion.
Figure 4:
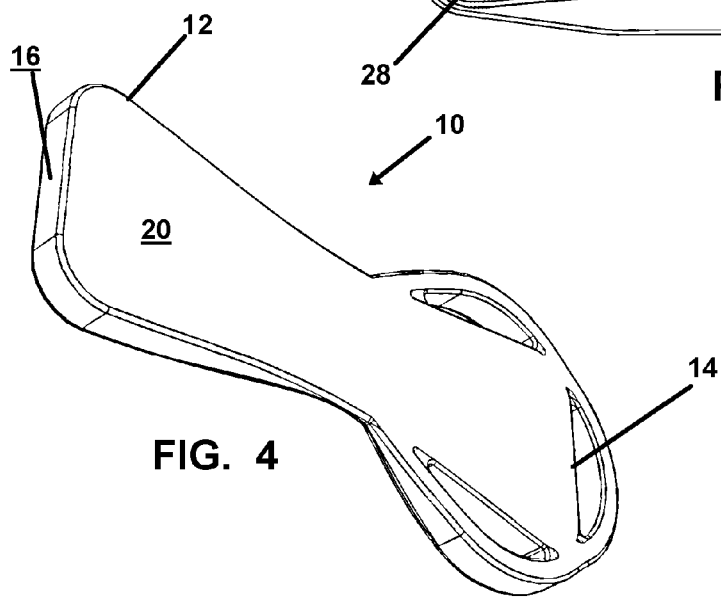
FIG. 4 is a perspective view of the device of FIG. 1.
Figure 8:
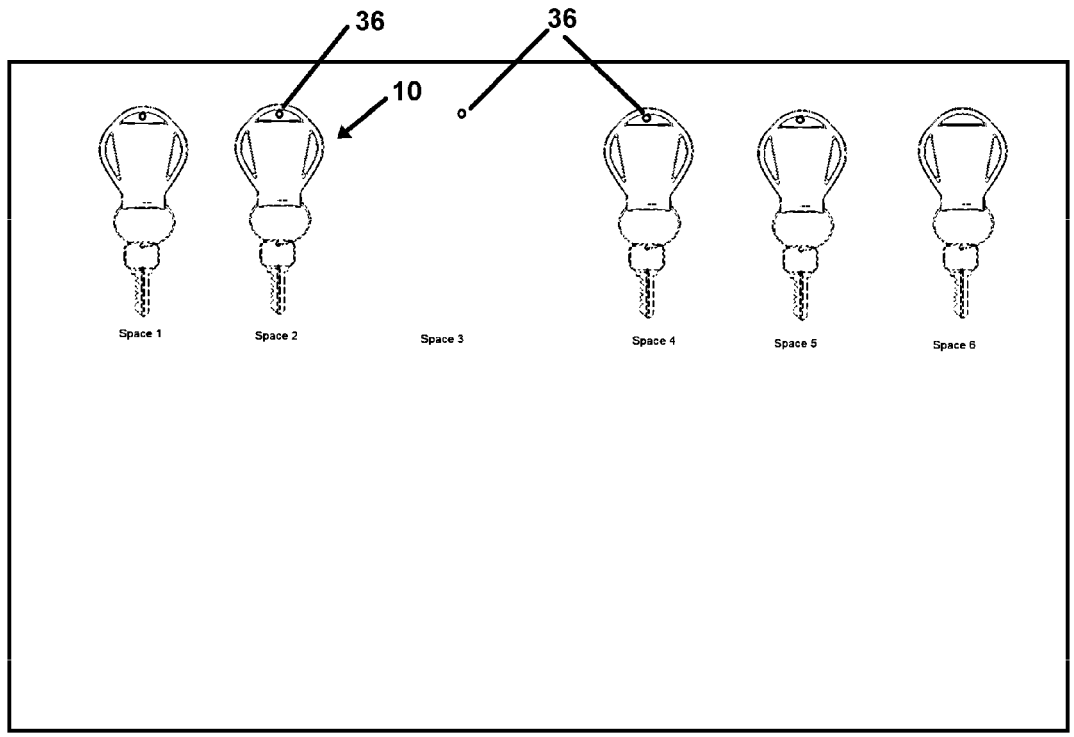
FIG. 8 depicts a plurality of the devices herein operatively engaged to as-used positions with respective key rings, and having apertures on the body engaged to mounts or hooks on a storage board.
Figure 9:
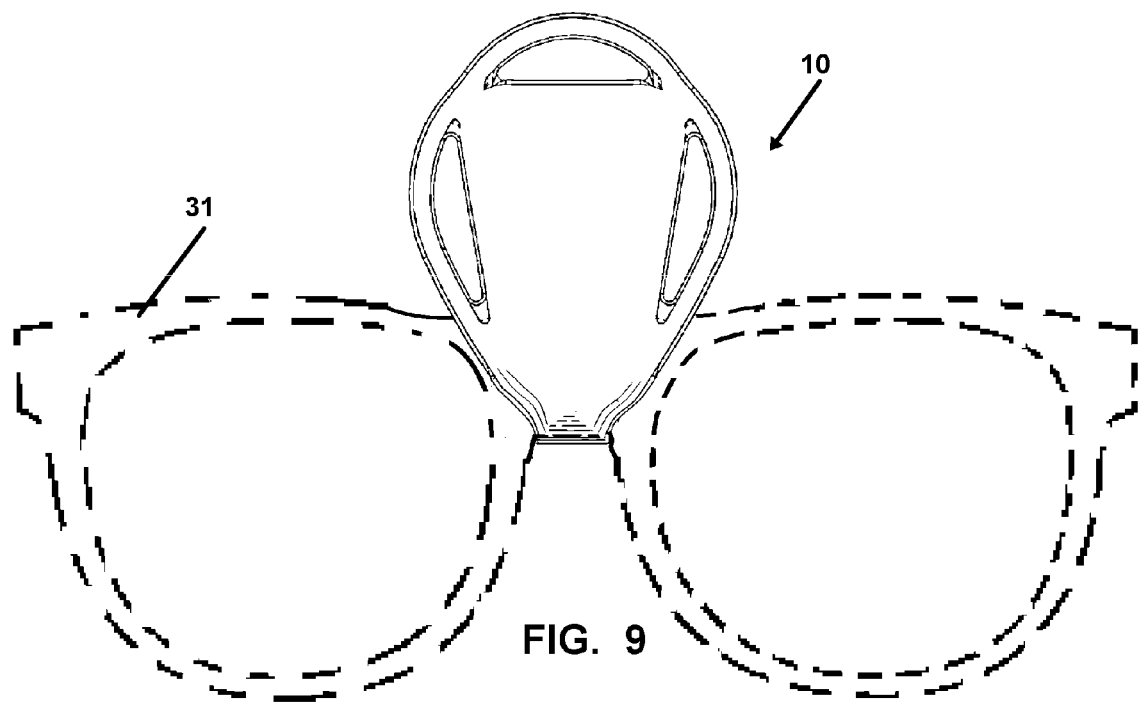
FIG. 9 depicts the device showing the flexible body folded to an as-used positioning engaged around the bridge of eyeglasses and conforming to the shape thereof.

As depicted in FIG. 2, a thickness of the body at the central portion 19, between the opposing ends 14 and 16, is formed thinner than the thickness of half portions of the body 12 between the central portion 19 and the first end 14 and second end 16. As can be seen in FIGS. 2 and 3, the flexible body 12 will tend to fold along an imaginary line running between the between opposing side edges 23 and 27, in the narrower central portion 19 of the body to position a surface adjacent the first end in contact with a surface adjacent the second end 16 when the body 12 of the device 10 is folded to form an as-used positioning such as in FIG. 3 for planar objects and FIGS. 6-7 for three dimensional objects.

As shown in FIGS. 2-3, in one preferred mode of the device 10 the thickness of the body 12 tapers from the thicker end portions adjacent the first end 14 and second end 16 to a thinnest portion or central portion 19 at a central area of the body 12 between the first end 14 and second end 16. This taper is shown formed by a recessed area descending into the second side surface 22 but could be formed in the first side surface 18 or equal recessed portions of both. However, forming it into one of the two side surfaces, has been shown to provide the added benefit of a bias or urging of the first end 14 to fold toward and against the second end 16, always in one direction. Such is especially preferable if indicia 24 or an area for writing indicia 24 is provided on the non tapered side surface to maintain that indicia 24 is always viewable.

The propensity to fold in one direction provided by the taper or recess of the central portion 19 being formed in only one of said first side 18 or as shown in said second side 20 is helpful to position the device to the as-used positioning of FIG. 3 in a compressed engagement around the end of planar material 26 such as paper or for example a pocket or edge on clothing, and place the aperture 28 in position to engage with a hook, or to provide a mount.

As shown in FIGS. 4-7 the device 10 has a body 12 with the first end 14 which will register with and mate to the second end 14, when the body is folded along the imaginary line across the taper or recess-formed central portion 19, and form the aperture 28 or loop to encircle a three dimensional object such as a key ring 30 or eyeglasses 31. Shown in FIG. 5, the arrows depict the direction of fold of the body with the tapered portion formed into the body 12 only on the second side 22 surface. The body 12 being of flexible or pliable material tends to conform to the shape of the object.

To mount the device 10 to an as-used positioning engaged for example with a key ring 30, the flexible material forming the body at the first or second end is folded to communicate the body 12 therethrough and position the key ring 30 within the taper or recess of the central portion 19. Thereafter as in FIG. 5, the body is folded and forms the aperture 28 which surrounds the key ring 30, and holds the body 12 in the as-used positioning engaged to the key ring 30.

Means to maintain a first end 14 of the body 12 adjacent and in contact with a second end 16 of the body 12 when folded over itself at the central portion 19 is provided by complimentary fasteners 32 or connectors, which engage with each other when the body 12 is folded as in FIG. 3 or 6. Currently, magnets 33 (FIG. 2) are the preferential complimentary fasteners 32 and are positioned entirely within the body 12 with opposing poles of each respective magnet positioned to attract each other when the body 12 is folded.

Thus on one end of the body 12 the south pole of the magnet will face the surface while on the opposite end of the body 12 the north pole of the magnet will face the same surface. If the device 10 is employed to position it to the as-used positioning with a ring 30 or the like, other mating fasteners or connectors may be employed since the object retained will not project from between the two engaged ends 14 and 16. However magnets have been shown in experimentation to work best as they can be mounted within the body 12 and below both the first side surface 20 and second side surface 22 and thereby only expose the flexible material forming the body 12 to the key ring 30 and whatever is engaged thereto.

The magnets if employed to have respective facing surfaces which self-align with each other when the body 12 is folded in the central portion 19 to form the aperture 28 or loop. If other complimentary mating fasteners are employed they also are positioned on the exterior of one side of the body 12 in positions to register and engage with each other when the body is folded as in FIG. 3 or 6.

As noted, also particularly preferred in the device 10 in all modes, is the provision of secondary apertures or apertures 34 positioned in engagement with the body 12 such as shown in FIG. 6 where the apertures 34 are positioned on three sides of the first end 14 of the body 12. While one or more apertures 34 might be formed through the body 12 itself by forming aligning passages on both the first end 14 and second end 16 it has been found to be superior to provide the apertures 34 on which the device 10 may hang when positioned upon a rack for instance, on an edge of the exterior circumference of the body 12. Such requires no alignment of apertures formed in both sides of the body, and also allows for larger apertures 34 and apertures 34 which will temporarily deform, and return to an original shape to allow for a hook or pin 36. Such will work especially well for instance in a parking garage environment where key rings 30 must constantly be engaged and disengaged from holders such as pins 36 as vehicles come and go.

As depicted in the figures herein, in a particularly preferred mode, at least one such aperture 34 or a plurality of such apertures 34 are formed at one end of the body 12 adjacent the circumferential edge 38 of the body 12 and a facing edge 40 of a curved rib 42, engaged with the body 12 at opposing ends of each rib 42. The ribs 42 are also formed of polymeric or similarly flexible but elastic material in a unitary structure with the body 12 such that the ribs can be temporarily deflected out of the plane of the body 12, to enlarge a respective aperture 34 it forms, and thereafter return to the original shape in plane with the body 12. This as noted, allows for easy engagement of the body 12 of the device 10 on a hook or peg 36 by insertion of such through the one or plurality of such apertures 34 formed by an engaged rib 42.

As shown in FIG. 6, the body 12 is formed preferably substantially planar on adjacent the opposing ends of the first side surface 20 and second side surface 22, to provide an excellent area for placement of indicia 24 upon the device 10. The identifying indicia 24 may be placed by printing or by writing upon the body 12 on areas of the planar side surfaces to allow for the addition of hand-imparted indicia 24 such as using a marker to write a license plate of the vehicle to which the engaged key ring matches.

Additionally, as can be seen in FIG. 3 for instance, it should be noted that while for convenience, the specification herein as focused on the employment of the device 10 for engagement of a ring 30, as shown in FIG. 6, the flexible body 12 and engaging opposing body halves can also be used to engage over an edge of a planar object such as papers 26 to hold them as a group, or clothing edges, to form a mount using the formed aperture 28. Or as noted, it may be employed to grasp other items such as the eyeglasses 21 depicted in FIG. 9 or on any object on which the body 12 may be folded over to allow it to conform to the shape thereof and engage the opposing first and second ends 14 and 16.

While all of the fundamental characteristics and features of the clip device invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications, variations and substitutions as would occur to one skilled in the art are included within the scope of the invention as defined by the following claims.

What is claimed is:
1. A clip comprising:
a flexible body having a first end opposite a second end and having opposing side edges extending therebetween;
said body having a first side surface opposite a second side surface;
a central portion of said body positioned between said first and second end;
said body foldable at said central portion to an as-used positioning engageable with an object, by positioning said first side surface adjacent a first end portion at said first end, in a removable engagement with said first side surface at a second end portion adjacent said second end;

a first magnet positioned within said body in-between said first side surface and said second side surface and adjacent said first end being positionable to a cooperative engagement with a second magnet positioned in-between said first side surface and said second side surface adjacent said second end of said body, said cooperative engagement maintaining said body in said as-used positioning engaged with said object;

a rib projecting from said body at said first end thereof, said rib engaged at opposite ends with an edge surface of said body;

an aperture positioned between a first edge of said rib communicating between said opposite ends thereof and an edge surface of said body running between opposite ends of said rib, and whereby said clip is removably engageable with an object by folding said body at said central portion to position said object in-between opposing portions of said first surface at said first end and said second end and engaging said first fastener with said second fastener.

2. A clip comprising:

a flexible body having a first end opposite a second end and having opposing side edges extending therebetween;

said body having a first side surface opposite a second side surface;

a central portion of said body positioned between said first and second end;

said body foldable at said central portion to an as-used positioning engageable with an object, by positioning said first side surface adjacent a first end portion at said first end, in a removable engagement with said first side surface at a second end portion adjacent said second end;

a first magnet positioned on said body adjacent said first end positionable to a cooperative engagement with a second magnet positioned adjacent said second end of said body, said cooperative engagement maintaining said body in said as-used positioning engaged with said object;

a rib projecting from said body at said first end thereof, said rib engaged at opposite ends with an edge surface of said body; and an aperture positioned between a first edge of said rib communicating between said opposite ends thereof and an edge surface of said body running between opposite ends of said rib;

said first end portion and said second end portion of said body having a first thickness in-between said first side surface and said second side surface, said central portion having a second thickness between said first side surface and said second side surface, said second thickness being less than said first thickness; and whereby said clip is removably engageable with an object by folding said body at said central portion to position said object in-between opposing portions of said first surface at said first end and said second end and engaging said first fastener with said second fastener.

3. The clip of claim 1 additionally comprising:

said first end portion and said second end portion of said body having a first thickness in between said first side surface and said second side surface; and said central portion having a second thickness between said first side surface and said second side surface, said second thickness being less than said first thickness.

4. The clip of claim 2 wherein said central portion is defined by a tapering depression depending into said first side surface.

5. The clip of claim 3 wherein said central portion is defined by a tapering depression depending into said first side surface.

* * * * *